United States Patent [19]

Aubert et al.

[11] 4,367,195

[45] Jan. 4, 1983

[54] TEMPERATURE HOMOGENIZATION APPARATUS

[75] Inventors: Michel Aubert, Manosque; Antoine Bret, Aix en Provenve; Guy Lemercier, Le Puy Sainte; Jean-Denis Montmayeur, Saint Egreve; Michel Sauvage, Aix en Provence; André Teytu, Grenoble, all of France

[73] Assignee: Commissariat a l'Energie Atomique, Paris, France

[21] Appl. No.: 165,679

[22] Filed: Jul. 3, 1980

[30] Foreign Application Priority Data

Jun. 29, 1979 [FR] France ............................ 79 16915

[51] Int. Cl.³ ....................... G21C 11/08; G21C 15/24
[52] U.S. Cl. .................................... 376/290; 376/367; 165/104.26
[58] Field of Search .................... 165/105; 176/37, 65, 176/38; 376/290, 367

[56] References Cited

U.S. PATENT DOCUMENTS

| 2,067,431 | 1/1937 | Albertson | 165/105 |
| 3,129,334 | 4/1964 | Loflin et al. | 165/105 |
| 3,220,213 | 11/1965 | Wakeman et al. | 165/105 |
| 4,022,658 | 5/1977 | Gama et al. | 176/65 |
| 4,078,968 | 3/1978 | Golden et al. | 176/38 |
| 4,092,140 | 5/1978 | Cerutti et al. | 165/105 |
| 4,115,192 | 9/1978 | Jogand | 176/65 |
| 4,116,765 | 9/1978 | Boy Marcotte et al. | 176/38 |
| 4,127,105 | 11/1978 | Watt | 165/105 |
| 4,140,103 | 2/1979 | Leigh | 165/105 |
| 4,222,436 | 9/1980 | Pravda | 165/105 |
| 4,240,257 | 1/1980 | Rakowsky et al. | 165/105 |
| 4,240,500 | 12/1980 | Rohner | 165/105 |
| 4,240,875 | 1/1980 | Katscher | 176/37 |

Primary Examiner—Sal Cangialosi
Attorney, Agent, or Firm—Michael N. Meller; Anthony H. Handal

[57] ABSTRACT

Apparatus for homogenizing the circumferential temperatures of the vertically axes ferrule of a component passing through the upper slab of a nuclear reactor, wherein it comprises at least one assembly forming a heat pipe describing the entire circumference of said ferrule in order to ensure the homogenization of the temperatures of said ferrule level with the assembly, means for fixing the assembly or assemblies forming the heat pipe on the inner face of the ferrule and means for ensuring a thermal contact between the assembly or assemblies forming the heat pipe and the said ferrule.

11 Claims, 6 Drawing Figures

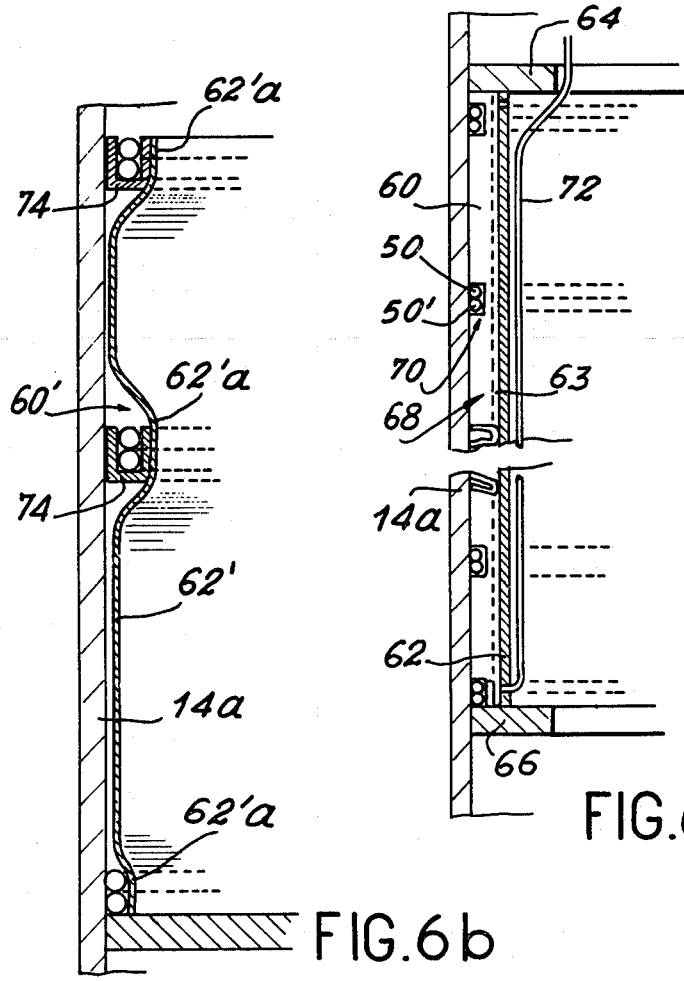
FIG.6a
FIG.6b
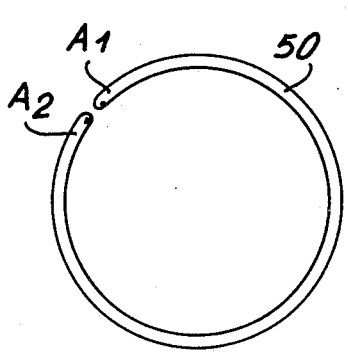
FIG.5a
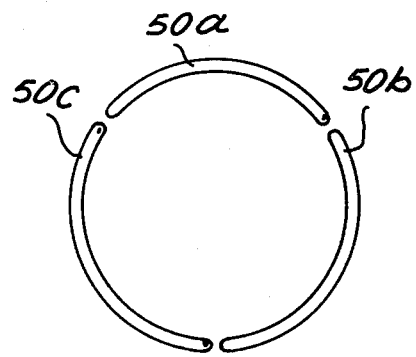
FIG.5b 4,367,195

TEMPERATURE HOMOGENIZATION APPARATUS

BACKGROUND OF THE INVENTION

The invention relates to an apparatus for circumferentially homogenizing temperatures of a ferrule of a component traversing the upper slab of a nuclear reactor.

More specifically, the present invention relates to an apparatus of this type applied to the case of components (circulating pumps, intermediate exchanger) mounted in a fast nuclear reactor cooled by a liquid metal, said reactor being of the integrated type.

In order to provide a better understanding of the problem solved by the present invention, reference is advantageously made to the attached FIGS. 1 and 2, which respectively show a fast neutron reactor of the integrated type in vertical section and a detailed view showing how a pump or intermediate exchanger traverses the slab.

FIG. 1 shows in simplified form the main reactor vessel 2 suspended on the upper concrete slab 4 provided with its system or rotary plugs 6. The main vessel 2 contains the inner vessel 8, which in turn contains the core 10 and the hot liquid metal (e.g. liquid sodium) leaving the core, the liquid metal level being designated by N. Above level N and below slab 4 there is an inert covering gas cushion 11 the gas being for example argon. The hot liquid metal enters intermediate exchangers such as 12, which are suspended on slab 4 and which traverse the latter by not shown cylindrical passages. In a similar way, circulating pumps such as 14 are suspended on slab 4 and traverse the latter by cylindrical passages 16. The invention relates to the problems linked with the traversal of the said slab.

FIG. 2 shows in a more detailed manner the passage of a pump 14 through slab 4. Pump 14 is surrounded by a pump ferrule 14a and slab 4, more particularly level with passage 16 is covered by a sheet 18. The slab is cooled by water pipes 20. Between pump ferrule 14a and the covering sheath 18, there is an intermediate ferrule 22 defining an outer annular space 24 and an inner annular space 26 (the same applies for the passage of an intermediate exchanger). The outer space 24 is insulated from the gaseous cover 11 by a hydraulic joint system (liquid sodium) with a container 28. Thus, there are no problems for the outer space 24, which is insulated from the remainder of the gaseous mass. Inner space 26 communicates with the gaseous cover 11.

Inner space 26 contains "open" thermosiphons, which are supplied by the inert gas in cover 11. These thermosiphons have an upward flow of hot gas and a downward flow of cool gas. Their characteristics are dependent on parameters which are at present not well known.

In the ferrule of the component, (intermediate exchanger or pump) these thermosiphons produce thermal indentations, which can be displaced in a circular manner (in a horizontal plane) and which thus create thermal cycles prejudicial to the good mechanical behaviour of the corresponding ferrules.

It is therefore necessary to eliminate or at least reduce these circumferential thermal gradients. For example, in the case of the French Super Phenix reactor, this circumferential gradient on the pump ferrule is estimated to be 200° C.

One solution would involve choosing all the ferrules with a material having a high thermal conductivity. However, such a solution is unacceptable. On the one hand, this is because the choice of such a material is considerably limited for cost and mechanical behaviour reasons and on the other and in particular because it is necessary to maintain a high vertical thermal gradient between the space 11 or the roof of the pile and the top of the slab 4. Thus, the upper end of the slab must be kept at a maximum temperature of approximately 50° C.

BRIEF SUMMARY OF THE INVENTION

The present invention specifically relates to an apparatus making it possible to homogenize the temperature of the ferrule of the component, i.e. reduce the horizontal thermal gradient in said ferrule, whilst maintaining the necessary vertical thermal gradient, whilst utilizing conventional nuclear material for the construction of the ferrules.

The apparatus essentially comprises at least one assembly forming a horizontal or substantially horizontal heat pipe located within the ferrule and in thermal contact with the latter. Preferably, there are numerous heat pipes spaced over the height of the ferrule.

It is possible either to use one and the same heat pipe positioned over substantially the entire circumference of the ferrule or a plurality of heat pipes placed end to end, whereby each heat pipe covers a fraction of the circumference.

In the case where the heat pipes are horizontal, each assembly forming a heat pipe constitutes a ring and thus defines a ferrule temperature homogenization level.

In the case where the heat pipes are slightly inclined (e.g. by approximately 2°), the heat pipe systems form a helix with a plurality of threads, each thread being formed by a number of heat pipes arranged end to end.

If each heat pipe system comprises a plurality of heat pipes arranged end to end and when each heat pipe only covers a portion of the circumference, it can be advantageous to superimpose two rings of heat pipes in such a way that the ends of the heat pipes of one ring are displaced relative to the ends of the heat pipes of the other ring.

BRIEF DESCRIPTION OF THE DRAWINGS

The invention is described in greater detail hereinafter relative to non-limitative embodiments and the attached drawings, wherein show:

FIGS. 5a and 5b two cross-sectional views corresponding respectively to the case where one or several heat pipes are used.

FIG. 5d is a diagrammatic illustration of a plurality of heat pipes fixed end to end in a helix in the manner of a continuous conduit attached to the wall of the ferrule.

FIGS. 6a and 6b half-views in vertical section showing two variants of the location of heat pipes in the ferrule of a pump.

DETAILED DESCRIPTION OF THE PREFERRED EMBODIMENTS

Although the apparatus according to the invention uses known heat pipes, it may be worthwhile explaining the operation thereof before describing in greater detail the apparatus according to the invention.

Figure 1:
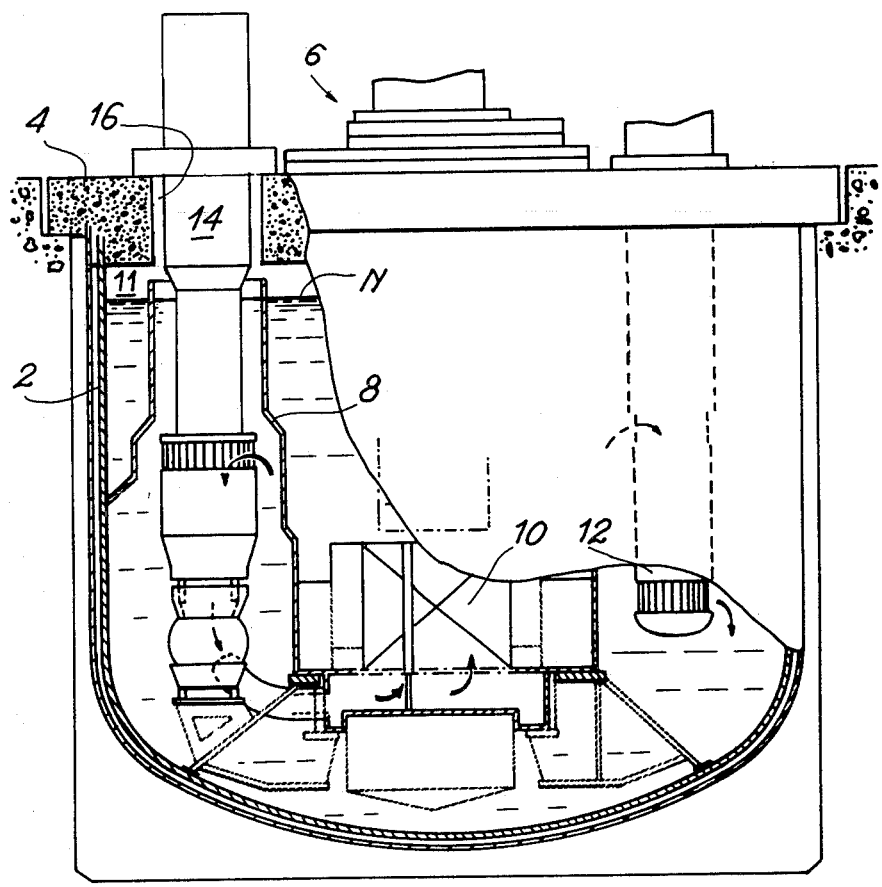
FIG. 1, which has already been described, a vertical sectional view of a fast neutron reactor of the integrated type.
Figure 2:
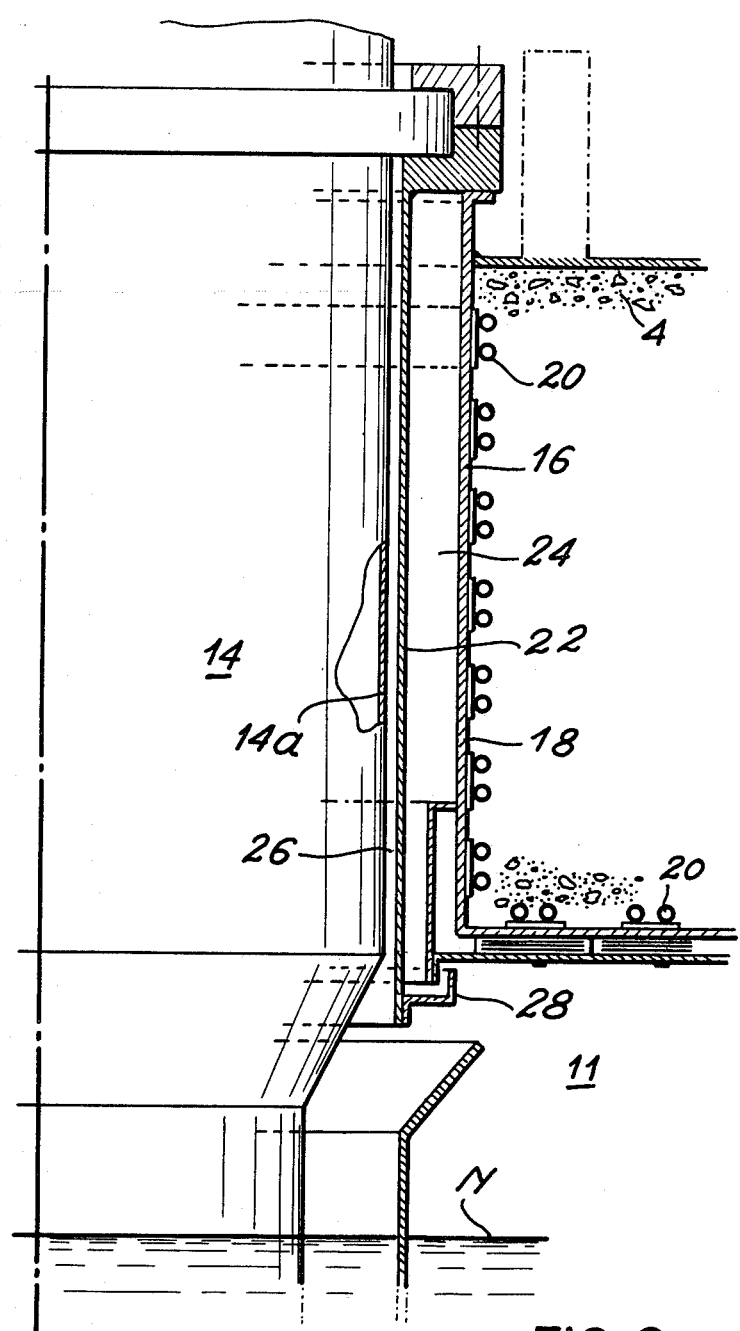
FIG. 2, which has already been described, a partial view of the reactor of FIG. 1 showing an embodiment of the traversal of the slab by a pump.
Figure 3:
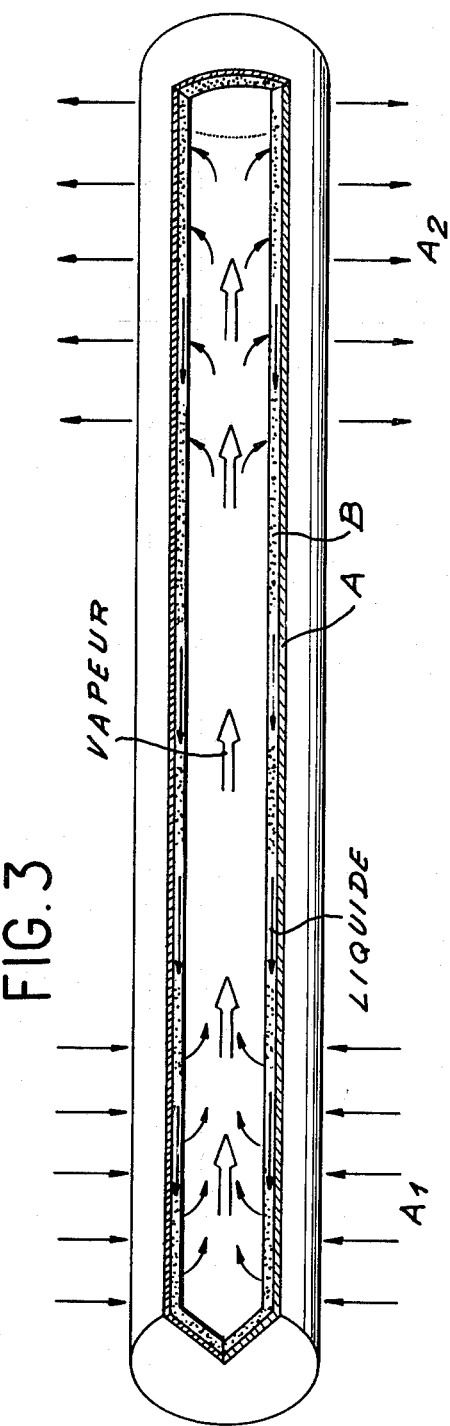
FIG. 3 a longitudinal sectional view of a known heat pipe.

Such a heat pipe is shown in FIG. 3 and is in the form of a tight cylinder defined by an envelope A. The cylinder has an end $A_1$ forming an evaporator and an end $A_2$ forming a condensor. The inner wall of envelope A is covered by a capillary structure B.

The envelope contains a heat transfer fluid. Heat is transported between these two ends $A_1$ and $A_2$ by displacement of the heat transfer fluid with change of state. The fluid vaporizes in zone $A_1$ and the vapour flows towards zone $A_2$. The return of the fluid after condensation takes place in the capillary structure.

In this way, the temperature is homogenized in the immediate vicinity of the heat pipe envelope. The isothermicity of the apparatus is due to the fact that over its entire length, the liquid contained and its vapour are in equilibrium at all times at the saturation temperature.

Figure 4A:
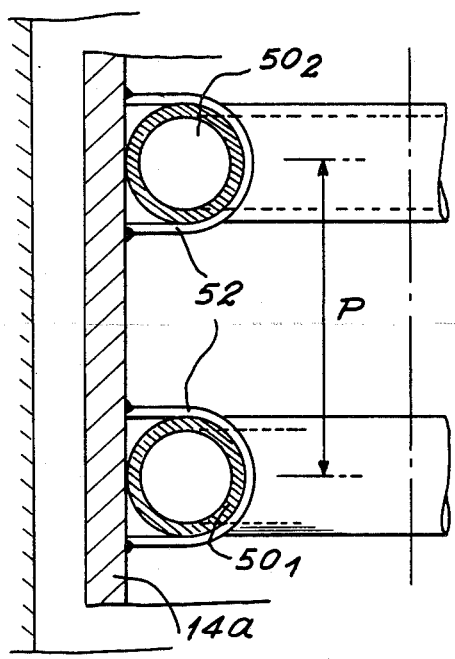
FIG. 4a a half-view in vertical section of the traversal of the slab by the ferrule of a component equipped with a homogenization apparatus according to the invention.

FIG. 4a shows a preferred mode of the fitting of heat pipes on the ferrule for obtaining the apparatus according to the invention.

The heat pipes, such as 50 forming rings are fixed to the inner face of ferrule 40a of the component, the heat pipes being positioned in horizontal planes. They are fixed, in accordance with the embodiment shown in FIG. 4a, by bridges 52 welded to the ferrule 14a. Two consecutive heat pipes 51, 52 are separated by a suitable pitch p. As a function of the value of the temperature variations at the different levels, it can be advantageous to vary this pitch over the height of the ferrule.

Figure 4B:
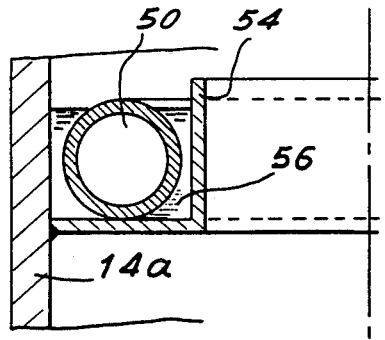
FIGS. 4b and 4c partial views showing variants for the fixing of the heat pipes.

According to the embodiment of FIG. 4b, the heat pipe 50 is supported by an annular container 54 welded by ferrule 14a. It can be of interest to provide a conductive material 46 in said container.

Figure 4C:
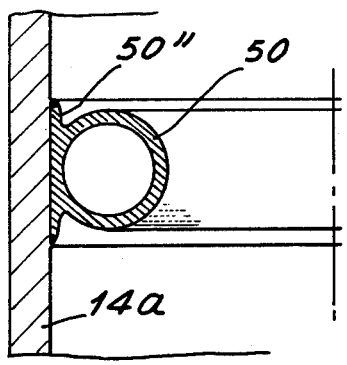

According to the embodiment of FIG. 4c, envelope A of heat pipe 40 has a base plate 50" welded to the ferrule 40a. This ensures a better thermal contact between ferrule and heat pipe.

Referring now to FIG. 5a, it can be seen that the annular heat pipe can comprise a single cylindrical pipe 50, whose ends $A_1$ and $A_2$ are close together. As shown in FIG. 5b, it can be simpler to construct the annular heat pipe by means of three individual heat pipes, e.g. 50a, 50b, 50c, each corresponding to an angle at the centre of approximately 120°.

Figure 5C:
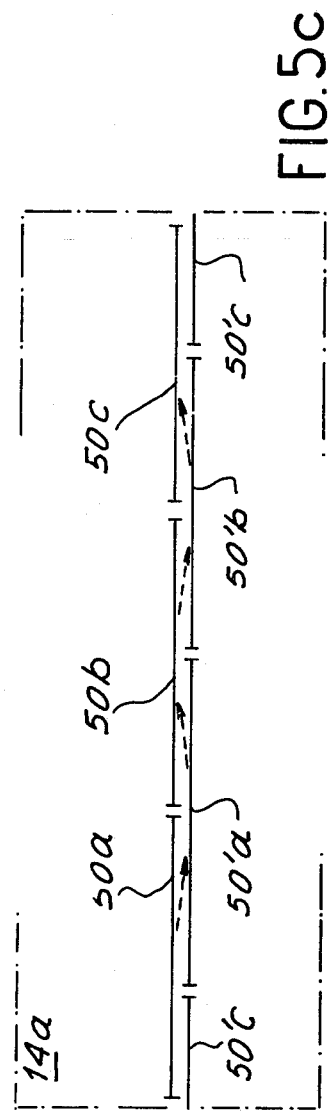
FIG. 5c a developed view illustrating the case where two heat pipe systems are superimposed.

In the case of this constructional variant, it is of interest to realise each homogenization level by means of two rows of three superimposed heat pipes (heat pipes 50a, 50b, 50c and heat pipes 50'a, 50'b and 50'c). Obviously, the two rows of heat pipes belonging to the same homogenization level are displaced relative to one another, as can be seen in FIG. 5c. 5d shows an embodiment of the heat pipes arranged in end to end relationship in the form of a helix.

FIG. 6a shows in greater detail another method for the installation of the temperature homogenization apparatus in pump ferrule 14a. According to this embodiment, each assembly or system incorporates two superimposed heat pipes 50 and 50'. These heat pipes are located in an annular space 60 within ferrule 14a and defined by a sealing ferrule 62 welded by its two ends to horizontal ledges 64 and 66. Thus, space 60 is tightly sealed. The heat pipes are held in place against the ferrule 14a by U-shaped vertical angle members 68, which are perforated by small holes 70 in order to hold the heat pipes. A pipe 72 makes it possible to fill space 60 with a metallic material having a low melting point in order to ensure a better thermal contact between heat pipes and ferrule 14a.

In order to reduce the liquid mass with a low melting point and to reduce axial conduction, it is possible to use a preshaped ceramic insulant placed between the heat pipes and the sealing ferrule 62. Thus, the liquid volume is reduced. It is also possible to use a loose insulant placed between the sealing ferrule 62 and a holding grating 63 positioned coaxially to the ferrule in space 60.

According to the variants shown in FIG. 6b, the sealing ferrules 62' have bulges 62'a to the right of groups of heat pipes. Each group of two heat pipes is located in a guide 74 welded to ferrule 62'. In addition, annular space 60' defined by ferrule 14a and ferrule 62' has a limited volume. Thus, the necessary volume of low melting point material is reduced and vertical thermal conduction limited.

It is also pointed out that, bearing in mind the temperatures involved in the apparatus according to the invention, it would appear preferable to use as the heat transfer fluid in the heat pipes either water or mercury. Water has a use range from 60° to 320° C., whilst the range for mercury is 180° to 650° C. The envelope and capillary of the heat pipes are made from stainless steel, for example types AISI304 L, AISI316 or AISI347 L.

It is important to note that due to the positioning of the heat pipes within the ferrule of the components, any leaks which may possibly occur in the heat pipes will not lead to the risk of any heat transfer fluid entering the liquid metal for cooling the reactor.

As can be gathered from the above description, due to the features of the invention, a reliable and effective homogenization is obtained of the circumferential temperatures of the ferrules of components at the point of passing through the upper slab of the nuclear reactor.

We claim:

1. In a Nuclear Reactor, apparatus for homogenizing the circumferential temperatures of a ferrule of a component having a vertical axis passing through the upper slab of such nuclear reactor, comprising at least one assembly forming a heat pipe circumscribing the entire circumference of said ferrule in order to ensure the homogenization of the temperatures of said ferrule level with the assembly, means for fixing such assembly forming the heat pipe on the inner face of the ferrule and means for ensuring a thermal contact between such assembly forming the heat pipe and the said ferrule.

2. Apparatus according to claim 1, comprising a plurality of assemblies forming heat pipes, each assembly being horizontal and having the general shape of a ring, said assemblies being distributed over the height of the ferrule.

3. Apparatus according to claim 2, wherein each assembly forming a heat pipe is constituted by a heat pipe substantially forming the circumference of the ferrule.

4. Apparatus according to claim 2, wherein each assembly forming a heat pipe is constituted by a plurality of heat pipes arranged end to end, whose assembly covers the entire circumference of the ferrule.

5. Apparatus according to claim 2, wherein each assembly forming a heat pipe is constituted by two rings of heat pipes arranged one above the other, each ring consisting of a plurality of heat pipes arranged end to end, the ends of the heat pipes of one ring being horizontally displaced with respect to the ends of the other ring.

6. Apparatus according to claim 1, constituted by a plurality of heat pipes arranged end to end, each heat pipe having a gradient with respect to the horizontal, the assemblies of heat pipes thus forming a helix winding several times around the ferrule.

7. Apparatus according to claim 3, wherein the heat pipes contain mercury or water.

8. Apparatus according to claim 3, wherein the heat pipes, are fixed to the inner face of the ferrule by bridges in order to ensure thermal contact between the heat pipes and the ferrule.

9. Apparatus according to claim 5, wherein the heat pipes are located in members forming containers fixed to the ferrule, said containers being filled with a heat conducting material.

10. Apparatus according to claim 3, wherein the heat pipes have a base plate arranged over the length thereof and which is welded to the ferrule.

11. Apparatus according to claim 3, wherein the heat pipes are located in a tightly sealed annular space defined by the ferrule and by a second ferrule within the first and wherein the apparatus comprises means for introducing a material with a low melting point.

* * * * *